No. 862,985. PATENTED AUG. 13, 1907.
H. L. MINTER.
TAP.
APPLICATION FILED NOV. 28, 1906.
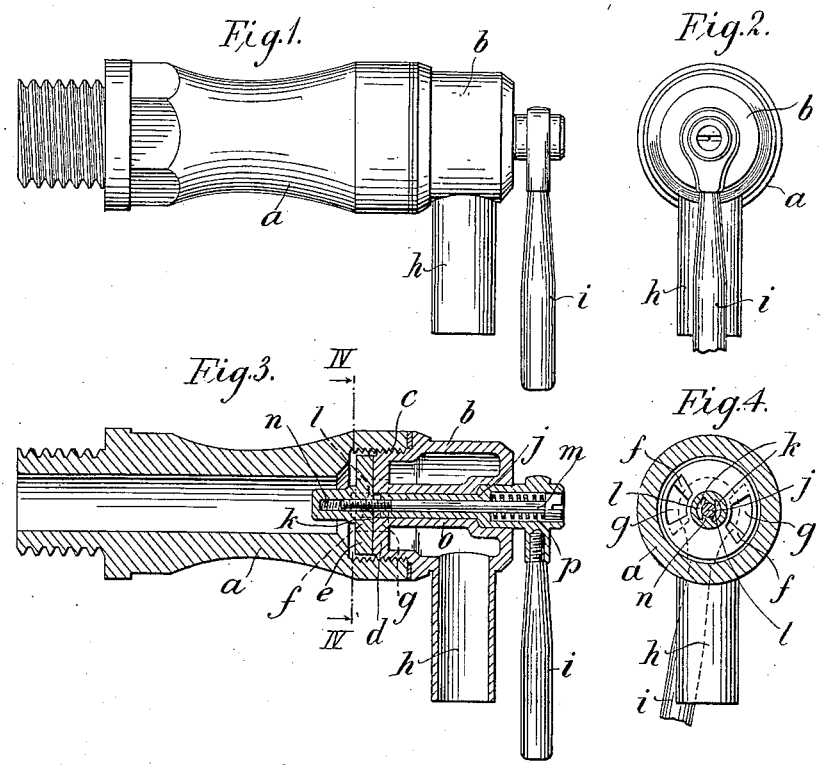
Witnesses.—
Samuel Payne
Agnes Tregg
Inventor.—
Henry L. Minter.
By H. C. Everett & Co.
Attorneys.

UNITED STATES PATENT OFFICE.

HENRY LAVENDER MINTER, OF LONDON, ENGLAND.

TAP.

No. 862,985.

Specification of Letters Patent.

Patented Aug. 13, 1907.

Application filed November 28, 1906. Serial No. 345,442.

*To all whom it may concern:*

Be it known that I, HENRY LAVENDER MINTER, a subject of the King of Great Britain and Ireland, residing at 36 Baronsmere road, East Finchley, London, N., England, have invented certain new and useful Improvements in Taps, of which the following is a specification, reference being had therein to the accompanying drawings.

This invention relates to improvements in taps; and it has for object to provide a tap which, while suitable for use with a fluid at ordinary pressure, is especially adapted for use with a fluid such as steam at high pressure.

In a tap in accordance with this invention, when the tap is open, the fluid, instead of passing through a port formed in a solid plug, as in a tap of usual construction, passes through one or more ports formed in a flat or dished seating on the tap casing, and through a corresponding port or correspondng ports formed in a flat or dished disk or valve that is rotatable on the said seating and that, during the flow of fluid, is maintained in fluid-tight contact with its seating by the action of a light spring.

This invention is hereinafter more particularly described with reference to the accompanying drawings; wherein Figures 1 and 2 are respectively a side and an end view of the exterior of the tap; Fig. 3 is a central longitudinal section thereof according to one construction; Fig. 4 is a transverse sectional view on the line IV—IV of Fig. 3.

The casing of the tap comprises a body $a$ adapted to be screwed into a tank, boiler, or the like, and a head $b$, that is screwed at $c$ into the body $a$, and has formed in it a seating $d$ for a rotatable disk or valve $e$ wherein there are formed one or more ports $f$ corresponding to a port or ports $g$ in the seating $d$ that communicate with the outlet $h$ on the heads $b$.

The disk or valve $e$ can be rotated to bring the ports $f$ and $g$ into coincidence by means of a handle $i$. The portion $e$, in the construction shown in Figs. 3 and 4, consists of a flat disk wherein there are formed a pair of ports $f$ arranged in opposite quadrants; while the seating $d$ in these constructions is also flat and is furnished with a pair of ports $g$ in opposite quadrants.

The spindle $j$, in the construction shown in Figs. 3 and 4 is tubular and is at its inner end formed with a pair of segmental projections $k$ that engage with corresponding segmental apertures $l$ in the disk $e$; and the said disk and spindle are in this construction secured together by means of a screw $m$ that passes through the bore of the spindle and is screwed into an internally threaded portion $n$ that projects from the disk $e$. In this construction, the spindle $j$ is inclosed within a sleeve $o$ that is connected with or formed integrally with the casing head $b$; all risk of escape of fluid under pressure at the point where the spindle passes through the casing being thus obviated. The projections $k$ preferably as shown, are not long enough to extend quite through the disk $e$, a little play being thus provided to allow the disk to be tightened up as it and its seating become worn.

In the construction above described there is provided a spring $p$ for keeping the disk in contact with its seating during the escape of fluid through the tap, this spring being arranged in proximity to the handle $i$. The tap is open when the handle is in either horizontal position, and shut when it is in either vertical position.

A tap such as hereinbefore described possesses the advantages that it is tight against the escape of fluid under pressure, that the faces of the valve and its seating can be easily and accurately ground, and that while fluid-tight, it is not liable to stick and can be opened and shut by means of but slight pressure.

What I claim is:—

In a tap, a hollow body, a hollow head screwed into the outer end of the hollow body and carrying a depending outlet pipe, a valve seat formed on the inner end of said head and provided with a port a hollow spindle extending through said head and provided on its inner end with projections, a valve disk engaging said valve seat and having apertures to receive the projections on said spindle, and also having an aperture therethrough, a rod extending through said hollow spindle and connecting with said valve disk, and having a head on its outer end, a spring arranged within said hollow spindle to bear against said head, and a handle connected to the hollow spindle for operating the valve disk, substantially as described.

In testimony whereof I affix my signature in the presence of two witnesses.

HENRY LAVENDER MINTER.

Witnesses:
G. L. BROWNE,
H. D. JAMIESON.